United States Patent
Tsuji et al.

(10) Patent No.: US 9,899,680 B2
(45) Date of Patent: Feb. 20, 2018

(54) NONAQUEOUS ELECTROLYTE SECONDARY BATTERY AND METHOD FOR MANUFACTURING THE SAME

(71) Applicant: PANASONIC CORPORATION, Osaka (JP)

(72) Inventors: Tomoki Tsuji, Osaka (JP); Takayuki Shirane, Osaka (JP); Shinji Mino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 438 days.

(21) Appl. No.: 14/122,962

(22) PCT Filed: Mar. 26, 2013

(86) PCT No.: PCT/JP2013/002052
§ 371 (c)(1),
(2) Date: Nov. 27, 2013

(87) PCT Pub. No.: WO2013/145721
PCT Pub. Date: Oct. 3, 2013

(65) Prior Publication Data
US 2014/0080003 A1    Mar. 20, 2014

(30) Foreign Application Priority Data

Mar. 30, 2012   (JP) .................. 2012-080238

(51) Int. Cl.
*H01M 4/13* (2010.01)
*H01M 4/583* (2010.01)
(Continued)

(52) U.S. Cl.
CPC ......... *H01M 4/5835* (2013.01); *H01M 4/364* (2013.01); *H01M 4/485* (2013.01);
(Continued)

(58) Field of Classification Search
CPC .... H01M 4/405; H01M 4/387; H01M 4/5835; H01M 4/364; H01M 4/485; H01M 10/0525; H01M 10/058
See application file for complete search history.

(56) References Cited

U.S. PATENT DOCUMENTS 6,605,386 B1    8/2003 Kasamatsu et al.
8,163,423 B2    4/2012 Kozono et al.
(Continued)

FOREIGN PATENT DOCUMENTS

CN    101523641 A    9/2009
JP    2000-173585 A    6/2000
(Continued)

OTHER PUBLICATIONS

International Search Report issued in International Application No. PCT/JP2013/002052 dated Jun. 4, 2013, with English Translation.
(Continued)

*Primary Examiner* — Jane Rhee
(74) *Attorney, Agent, or Firm* — McDermott Will & Emery LLP (57) ABSTRACT

The nonaqueous electrolyte secondary battery of the present invention includes a positive electrode, a negative electrode, a separator disposed between the positive electrode and the negative electrode, and a nonaqueous electrolyte. The positive electrode contains a positive electrode active material composed of a lithium-containing transition metal oxide having a layered crystal structure. The negative electrode contains a negative electrode active material composed of a Ti-based oxide and an additive composed of fluorinated carbon that reacts with lithium at a more noble potential as compared to the negative electrode active material. In the nonaqueous electrolyte secondary battery of the present (Continued)

invention, the battery voltage reaches a discharge cut-off voltage by a potential change in the negative electrode.

4 Claims, 5 Drawing Sheets

(51) Int. Cl.
*H01M 10/0525* (2010.01)
*H01M 4/36* (2006.01)
*H01M 4/485* (2010.01)
*H01M 10/058* (2010.01)

(52) U.S. Cl.
CPC ...... *H01M 10/0525* (2013.01); *H01M 10/058* (2013.01); *Y02T 10/7011* (2013.01)

(56) References Cited

U.S. PATENT DOCUMENTS

| | | |
|---|---|---|
| 8,349,495 B2 | 1/2013 | Inagaki et al. |
| 2009/0047579 A1 | 2/2009 | Jang et al. |
| 2010/0009268 A1 | 1/2010 | Hitomi et al. |
| 2012/0140378 A1* | 6/2012 | Tan et al. ............ 361/500 |

FOREIGN PATENT DOCUMENTS

| | | |
|---|---|---|
| JP | 2000-348725 A | 12/2000 |
| JP | 2001-126727 A | 5/2001 |
| JP | 2001-143702 A | 5/2001 |
| JP | 2011-003500 A | 1/2011 |
| JP | 4625744 B2 | 2/2011 |
| WO | 2007/064043 A1 | 6/2007 |

OTHER PUBLICATIONS

Search Report issued in Chinese Patent Application No. 201380001537.3 dated Apr. 2, 2015, with English Translation.
Extended European Search Report dated Nov. 13, 2015 issued in European Patent Application No. 13769179.6.

* cited by examiner

NONAQUEOUS ELECTROLYTE SECONDARY BATTERY AND METHOD FOR MANUFACTURING THE SAME

RELATED APPLICATIONS

This application is the U.S. National Phase under 35 U.S.C. § 371 of International Application No. PCT/JP2013/002052, filed on Mar. 26, 2013, which in turn claims the benefit of Japanese Application No. 2012-080238, filed on Mar. 30, 2012, the disclosures of which applications are incorporated by reference herein.

TECHNICAL FIELD

The present invention relates to a nonaqueous electrolyte secondary battery and a method of manufacturing the same.

BACKGROUND ART

Recently, various nonaqueous electrolyte secondary batteries have been developed. Typical nonaqueous electrolyte secondary batteries include lithium ion secondary batteries. Conventionally, carbon materials are mainly used as negative electrode active materials for lithium ion secondary batteries and have been put to practical use. The lithium ion secondary batteries using the carbon materials as the negative electrode active materials are characterized by high electromotive force and high energy density and are used as main power supplies for mobile communication devices and portable electronic devices. Furthermore, lithium-titanium composite oxide materials that can be used as negative electrode active materials have been newly developed and are attracting attention. For example, a lithium ion secondary battery using $Li_4Ti_5O_{12}$ as the negative electrode active material has already been put to practical use.

$Li_4Ti_5O_{12}$ is a material having a spinel-type crystal structure and can absorb and release Li repeatedly. Accordingly, $Li_4Ti_5O_{12}$ can be used as an active material for lithium ion secondary batteries. $Li_4Ti_5O_{12}$ absorbs or releases Li at a potential of approximately 1.5 V with respect to the standard redox potential (Li/Li$^+$) of lithium. Therefore, it is considered that when $Li_4Ti_5O_{12}$ is used in a lithium ion secondary battery as the negative electrode active material, a highly safe lithium ion secondary battery can be obtained in which a lithium metal tends not to be deposited on the negative electrode even when reaction overpotential is caused by, for example, quick charging. Furthermore, since the lithium ion secondary battery undergoes very small lattice expansion and contraction resulting from charge and discharge and thus has a stable crystal structure, it has good cycle characteristics and is therefore expected to be used for a home electric power storage system, a motor-powered motorcycle, an electric vehicle, a hybrid electric vehicle, etc.

On the other hand, an oxide material having a layered or spinel-type crystal structure is commonly used as a positive electrode active material for lithium ion secondary batteries. Particularly, a material having a layered crystal structure is excellent in terms of high capacity. Typical examples include $LiCoO_2$, $LiNi_{5/6}Co_{1/6}O_2$, and $LiNi_{1/3}Mn_{1/3}Co_{1/3}O_2$.

Therefore, lithium ion secondary batteries are being developed, which are composed of a combination of a positive electrode that contains, as a positive electrode active material, an oxide material having a layered crystal structure and a negative electrode that contains $Li_4Ti_5O_{12}$ as a negative electrode active material. For example, Patent Literature 1 proposes a nonaqueous secondary battery in which a lithium titanate compound represented by general formula $Li_aTi_{3-a}O_4$ (wherein a indicates a number in the range of 0<a<3) is used as a negative electrode active material and a compound represented by general formula $LiCo_bNi_{1-b}O_2$ (0≤b≤1) and/or $LiAl_cCo_dNi_{1-c-d}O_2$ (0≤c≤1, 0≤d≤1, 0≤c+d≤1) is used as a positive electrode active material.

Generally, irreversible capacity during the initial charge and discharge of the negative electrode containing $Li_4Ti_5O_{12}$ used as the negative electrode active material is smaller than that of the positive electrode containing an oxide material having a layered crystal structure used as the positive electrode active material. Accordingly, the single electrode potential of the positive electrode changes before the single electrode potential of the negative electrode changes at the end of discharge, and thereby the battery voltage reaches discharge cut-off voltage (hereinafter, this is referred to as "positive electrode limitation". Conversely, the single electrode potential of the negative electrode changes before the single electrode potential of the positive electrode changes and thereby the battery reaches the cut-off voltage, which is referred to as "negative electrode limitation". Furthermore, both the single electrode potential of the positive electrode and the single electrode potential of the negative electrode change and thereby the battery reaches the cut-off voltage, which is referred to as "positive-negative electrode limitation."). Therefore, in the case of the battery of Patent Literature 1, irreversible capacity during the initial charge and discharge of the positive electrode is larger than that during the initial charge and discharge of the negative electrode, which results in the positive electrode limitation.

Generally, in the case where the positive electrode contains, as the positive electrode active material, an oxide material having a layered crystal structure, the repetition of insertion and desorption of lithium in a discharge end region where the single electrode potential changes considerably results in a bigger change in crystal structure, which results in a higher cycle degradation rate of the single electrode. $Li_4Ti_5O_{12}$ undergoes a very small change in crystal structure caused by insertion and desorption of lithium. Accordingly, the negative electrode containing $Li_4Ti_5O_{12}$ has a very low cycle degradation rate of the single electrode even when insertion and desorption of lithium are repeated in the range where the single electrode potential changes considerably. As described above, the conventional battery proposed in Patent Literature 1 is of a positive electrode limitation type. Therefore, in the conventional battery, the potential of the positive electrode changes considerably at the end of discharge, which results in a high cycle degradation rate of the positive electrode as a single electrode, and thus the cycle degradation of the battery becomes pronounced.

Consequently, the addition of a metal oxide such as an oxide containing manganese to a negative electrode is proposed as a technique for suppressing the cycle degradation of the battery caused by the reason described above (Patent Literature 2).

CITATION LIST

Patent Literature

Patent Literature 1 JP 2001-143702 A
Patent Literature 2 JP 4625744 B

SUMMARY OF INVENTION

Technical Problem

However, like in the battery described in Patent Literature 2, the composition in which metal oxide is added to the negative electrode may have a difficulty in effectively suppressing the cycle degradation of the battery by the metal oxide added to the negative electrode. Therefore, there has been room for further improvement.

Thus, the present invention is intended to provide a nonaqueous electrolyte secondary battery with excellent cycle characteristics, in which the cycle degradation of the battery is suppressed effectively.

Solution to Problem

The present invention provides a nonaqueous electrolyte secondary battery that includes:

a positive electrode containing a positive electrode active material composed of a lithium-containing transition metal oxide having a layered crystal structure;

a negative electrode containing a negative electrode active material composed of a Ti-based oxide and an additive composed of fluorinated carbon that reacts with lithium at a more noble potential as compared to the negative electrode active material;

a separator disposed between the positive electrode and the negative electrode; and a nonaqueous electrolyte, wherein voltage of the battery reaches a discharge cut-off voltage by a potential change in the negative electrode.

Advantageous Effects of Invention

In the nonaqueous electrolyte secondary battery of the present invention, the additive composed of fluorinated carbon that reacts with lithium at a more noble potential as compared to the negative electrode active material is electrochemically reduced in the negative electrode during the initial charge before the negative electrode active material is electrochemically reduced. As a result, the nonaqueous electrolyte secondary battery has a large irreversible capacity of the negative electrode, which results in the negative electrode limitation at the end of discharge. Therefore, according to the nonaqueous electrolyte secondary battery of the present invention, a large potential change of the positive electrode is suppressed at the end of discharge and thereby the cycle degradation of the positive electrode is suppressed. Thus the cycle characteristics of the battery is improved. Furthermore, the fluorinated carbon reacts with lithium at a potential that is sufficiently more noble as compared to the negative electrode active material composed of a Ti-based oxide. Moreover, the fluorinated carbon has a very large reaction capacity with respect to lithium ions. Accordingly, since the present invention can provide the negative electrode limitation while keeping the amount of the additive small, it can effectively suppress the cycle degradation of the battery without considerably reducing the negative electrode capacity due to the addition of the additive.

As described above, according to the present invention, the cycle degradation of the battery is suppressed effectively and thereby a nonaqueous electrolyte secondary battery with excellent cycle characteristics can be provided.

DESCRIPTION OF EMBODIMENTS

As described in the section of [BACKGROUND ART], the battery described in Patent Literature 2 allows the cycle characteristics to be improved. However, the present inventors found that this conventional battery had the following problem. In the battery described in Patent Literature 2, it may be difficult to effectively suppress the cycle degradation of the battery by using a metal oxide, and therefore in order to improve the cycle characteristics sufficiently, it was necessary to increase the amount of the metal oxide to be added thereto. As a result, the ratio of the negative electrode active material contained in the negative electrode may decrease, which may result in a possibility of reducing the negative electrode capacity. Thus, the present inventors deeply studied this problem, which led them to provide the following nonaqueous electrolyte secondary battery of the present invention and method of manufacturing the same.

A first aspect of the present invention provides a nonaqueous electrolyte secondary battery that includes:

a positive electrode containing a positive electrode active material composed of a lithium-containing transition metal oxide having a layered crystal structure;

a negative electrode containing a negative electrode active material composed of a Ti-based oxide and an additive composed of fluorinated carbon that reacts with lithium at a more noble potential as compared to the negative electrode active material;

a separator disposed between the positive electrode and the negative electrode; and a nonaqueous electrolyte, wherein voltage of the battery reaches a discharge cut-off voltage by a potential change in the negative electrode.

In the nonaqueous electrolyte secondary battery according to the first aspect, the additive composed of fluorinated carbon that reacts with lithium at a more noble potential as compared to the negative electrode active material is electrochemically reduced in the negative electrode during the initial charge before the negative electrode active material is electrochemically reduced. As a result, the nonaqueous electrolyte secondary battery has a large irreversible capacity of the negative electrode, which results in the negative electrode limitation at the end of discharge. Therefore, according to the nonaqueous electrolyte secondary battery of the first aspect, a large potential change of the positive electrode is suppressed at the end of discharge and thereby the cycle degradation of the positive electrode is suppressed.

Thus the cycle characteristics of the battery is improved. Furthermore, the fluorinated carbon reacts with lithium at a potential that is sufficiently more noble as compared to the negative electrode active material composed of a Ti-based oxide. Moreover the fluorinated carbon has a very large reaction capacity with respect to lithium. Accordingly, the first aspect can provide the negative electrode limitation while keeping the amount of the additive small. As a result, it can effectively suppress the cycle degradation of the battery without considerably reducing the negative electrode capacity due to the addition of the additive. As described above, according to the nonaqueous electrolyte secondary battery of the first aspect, the cycle degradation of the battery is suppressed effectively and thereby a nonaqueous electrolyte secondary battery with excellent cycle characteristics can be provided.

A second aspect of the present invention provides a nonaqueous electrolyte secondary battery as set forth in the first aspect, wherein the additive is added in the negative electrode in a range of 3 parts by weight or less with respect to 100 parts by weight of the negative electrode active material.

The nonaqueous electrolyte secondary battery according to the second aspect provides the negative electrode limitation despite the very small amount of the additive contained in the negative electrode. Therefore, the second aspect can effectively suppress the cycle degradation of the battery while further suppressing the negative electrode capacity from being reduced.

A third aspect of the present invention provides a nonaqueous electrolyte secondary battery as set forth in the first or second aspect, wherein the Ti-based oxide is $Li_4Ti_5O_{12}$.

In the nonaqueous electrolyte secondary battery according to the third aspect, $Li_4Ti_5O_{12}$ that is used as the negative electrode active material absorbs or releases Li at a potential of approximately 1.5 V with respect to the standard redox potential of lithium ($Li/Li^+$). Therefore, even if reaction overpotential is caused by, for example, quick charging, the lithium metal tends not to deposit on the negative electrode and very small lattice expansion and contraction result from charge and discharge. Accordingly, the single electrode has a considerably low cycle degradation rate and therefore the charge and discharge cycle characteristics can be further improved.

A fourth aspect of the present invention provides a method of manufacturing a nonaqueous electrolyte secondary battery, including:

a positive electrode production step for producing a positive electrode containing a positive electrode active material composed of a lithium-containing transition metal oxide having a layered crystal structure;

a negative electrode production step for preparing a mixture containing a negative electrode active material composed of a Ti-based oxide and an additive composed of fluorinated carbon that reacts with lithium at a more noble potential as compared to the negative electrode active material and producing a negative electrode using the mixture, and an assembly step in which using the positive electrode obtained in the positive electrode production step, the negative electrode obtained in the negative electrode production step, and a separator, an electrode group is produced with the separator being disposed between the positive electrode and the negative electrode and the electrode group is impregnated with a nonaqueous electrolyte.

According to the manufacturing method of the fourth aspect, a nonaqueous electrolyte secondary battery can be manufactured that has the same configuration and provides the same functional effect, as those of the nonaqueous electrolyte secondary battery according to the first aspect.

Hereinafter, an embodiment of the nonaqueous electrolyte secondary battery of the present invention and the method of manufacturing the same is described with reference to the drawings.

A nonaqueous electrolyte secondary battery of this embodiment includes a positive electrode, a negative electrode, a separator disposed between the positive electrode and the negative electrode, and a nonaqueous electrolyte. The positive electrode contains a positive electrode active material composed of a lithium-containing transition metal oxide having a layered crystal structure. The negative electrode contains a negative electrode active material composed of a Ti-based oxide and an additive that reacts with lithium at a more noble potential as compared to the negative electrode active material. For the additive, fluorinated carbon is used. The nonaqueous electrolyte secondary battery of this embodiment is a battery in which the battery voltage reaches the discharge cut-off voltage by a potential change in the negative electrode, that is, a battery of a negative electrode limitation type. Such a configuration allows the nonaqueous electrolyte secondary battery of this embodiment to have excellent cycle characteristics.

First, with respect to a lithium ion secondary battery as an embodiment of the nonaqueous electrolyte secondary battery of the present invention, an example of its configuration is described.

Figure 1A:
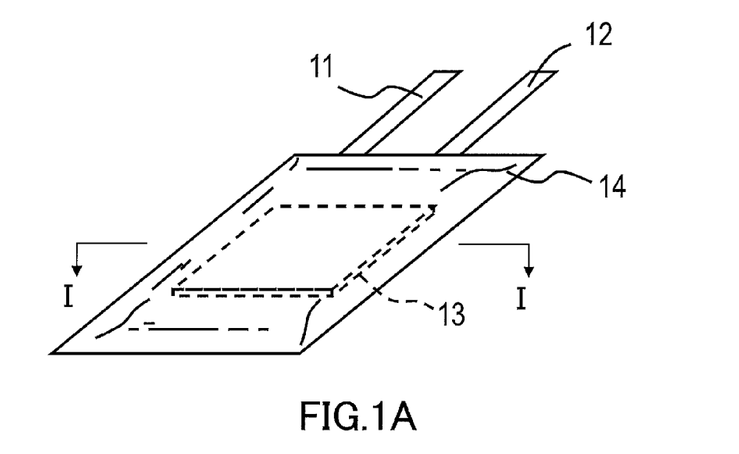
FIG. 1A is a perspective view showing a lithium ion secondary battery, which is an embodiment of a nonaqueous electrolyte secondary battery of the present invention.
Figure 1B:
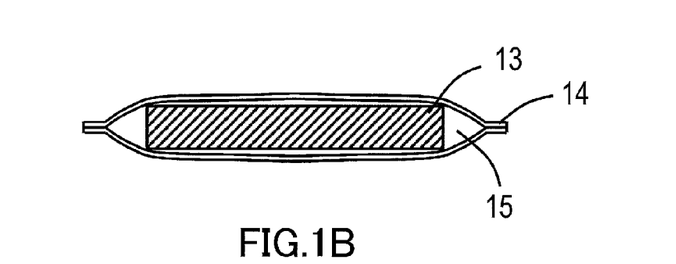
FIG. 1B is a sectional view taken along line I-I in FIG. 1A.

FIG. 1A is a perspective view of the lithium ion secondary battery of this embodiment. FIG. 1B shows a cross-section taken along line I-I in FIG. 1A. As shown in FIGS. 1A and 1B, the lithium ion secondary battery of this embodiment includes an electrode group 13, a battery case 14 that accommodates the electrode group 13, and a nonaqueous electrolyte solution (a nonaqueous electrolyte) 15 that fills the inside of the battery case 14. A positive electrode in the electrode group 13 is connected to a positive electrode lead 11. A negative electrode in the electrode group 13 is connected to a negative electrode lead 12. The positive electrode lead 11 and the negative electrode lead 12 are led out of the battery case 14.

The nonaqueous electrolyte solution 15 can be any one that generally can be used for a lithium ion secondary battery. For example, a solution with $LiPF_6$ (commercial battery grade) dissolved as a supporting electrolyte salt at a concentration of, for example, 1 mol/L in a propylene carbonate (PC) (commercial battery grade) used as a nonaqueous solvent can be used as the nonaqueous electrolyte solution 15. In this embodiment, a combination of a nonaqueous solvent and a supporting electrolyte salt was used as an example of the nonaqueous electrolyte solution 15. However, another combination can be used as long as it generally can be used for lithium ion secondary batteries. For example, cyclic carbonate such as ethylene carbonate and chain carbonate such as dimethyl carbonate and ethyl methyl carbonate can be used as the nonaqueous solvent. Furthermore, cyclic ester such as gamma-butyrolactone and chain ester such as methyl propionate may be contained as the nonaqueous solvent. For the supporting electrolyte salt, another lithium salt may be used as long as it is a lithium salt, such as lithium tetrafluoroborate, that can be used as a supporting electrolyte salt of an electrolytic solution for lithium ion batteries. It should be understood that they are not limited to these nonaqueous solvents and supporting electrolyte salts.

Figure 1C:
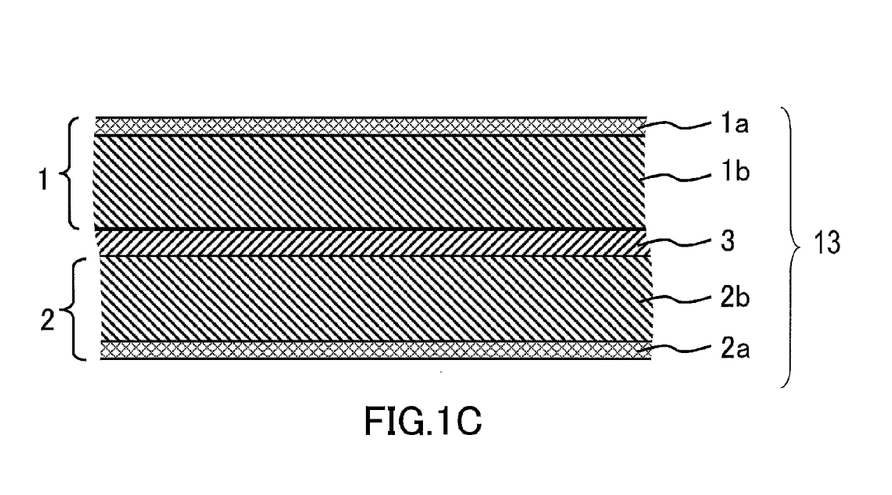
FIG. 1C is a magnified sectional view of an electrode group 13 shown in FIGS. 1A and 1B.

FIG. 1C shows a magnified cross-section of the electrode group 13. As shown in FIG. 1C, the electrode group 13 includes a positive electrode 1, a negative electrode 2, and a separator 3 provided between the positive electrode 1 and the negative electrode 2. The positive electrode 1 has a positive electrode collector 1a made of, for example, an aluminum foil and a positive electrode mixture layer 1b disposed on the surface of the positive electrode collector 1a. The positive electrode mixture layer 1b contains a positive electrode active material composed of $LiNi_{0.80}Co_{0.15}Al_{0.05}O_2$, which is a lithium-containing transition metal oxide having a layered crystal structure. On the other hand, the negative electrode 2 has a negative electrode collector 2a made of, for example, an aluminum foil and a negative electrode mixture layer 2b disposed on the surface of the negative electrode collector 2a. The negative electrode mixture layer 2b contains a negative electrode active material composed of lithium titanate ($Li_4Ti_5O_{12}$), which is a Ti-based oxide, and an additive composed of fluorinated carbon that reacts with lithium at a more noble potential as compared to the negative electrode active material. The separator 3 is formed of, for example, a polyethylene microporous sheet. However, when a separator containing polyolefin such as polyethylene used therein and a nonaqueous solvent containing propylene carbonate as its main component are used in combination, it is preferable that the separator be subjected to surface treatments for improving the wettability such as a corona discharge treatment and a plasma discharge treatment. Furthermore, for example, a paper-like sheet made of cellulose fibers also can be used for the separator. In this case, no surface treatments are required.

The positive electrode active material contained in the positive electrode mixture layer 1b may be a lithium-containing transition metal oxide other than $LiNi_{0.80}Co_{0.15}Al_{0.05}O_2$. Examples thereof include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (M is at least one selected from Na, Mg, Sc, Y, Mn, Fe, Co, Ni, Cu, Zn, Al, Cr, Pb, Sb, and B; and x, y, and z satisfy the following ranges: x=0 to 1.2, y=0 to 0.9, and z=1.7 to 2.3.). In addition to these materials, any materials in which the potential of the positive electrode 1 exceeds 4V with respect to a lithium standard during charge can be used as the positive electrode active material. Furthermore, a plurality of different materials may be mixed together to be used as the positive electrode active material. When the positive electrode active material is a powder, the average particle diameter thereof is not particularly limited but a powder with an average particle diameter of, for example, 0.1 to 30 μm is preferable. The positive electrode mixture layer 1b generally has a thickness of approximately 50 to 200 μm but the thickness is not particularly limited. The positive electrode mixture layer 1b may have a thickness of 0.1 to 50 μm. The average particle diameter described herein is a value measured by the laser diffraction scattering method.

The positive electrode mixture layer 1b may contain both a binding agent and a conductive agent or only either one of them other than the oxide described above. Alternatively, the positive electrode mixture layer 1b may contain neither a conductive agent nor a binding agent but may be composed of a positive electrode active material alone.

The conductive agent used in the positive electrode mixture layer 1b can be any electron conductive material that does not undergo chemical changes at the charge and discharge potentials of the positive electrode 1. For example, graphites, carbon blacks, conductive fibers such as carbon fibers and metal fibers, metal powders, conductive whiskers, conductive metal oxide, or an organic conductive material may be used alone or a mixture thereof may be used. The amount of the conductive agent to be added is not particularly limited but is preferably 1 to 50 wt % and particularly preferably 1 to 30 wt % with respect to the positive electrode active material.

A thermoplastic resin and a thermosetting resin can be used for the binding agent used in the positive electrode mixture layer 1b. Examples of preferable binding agents include a polyolefin resin such as polyethylene and polypropylene, a fluorine-based resin such as polytetrafluoroethylene (PTFE), polyvinylidene fluoride (PVdF), hexafluoropropylene (HFP), and a copolymer resin thereof, as well as polyacrylic acid and a copolymer resin thereof.

In addition to the conductive agent and the binding agent, a filler, a dispersant, an ion conductor, a pressure intensifier, and other various additives can be used. The filler can be any one as long as it is a fibrous material that does not undergo chemical changes inside the lithium ion secondary battery.

The material for the positive electrode collector 1a can be any material as long as it is an electronic conductor that does not undergo chemical changes at the charge and discharge potentials of the positive electrode 1. For example, stainless steel, aluminum, titanium, carbon, and a conductive resin can be used. Furthermore, the surface of the positive electrode collector 1a may be provided with irregularities by a surface treatment. The form thereof can be any one of, for example, a film, a sheet, a net, punched metal, expanded metal, a porous material, a foam, a fiber group, a nonwoven fabric material, and any one of molded bodies thereof in addition to a foil. The thickness of the positive electrode collector 1a is not particularly limited but is generally 1 to 500 μm.

In this embodiment, $Li_4Ti_5O_{12}$ that is used as the negative electrode active material absorbs or releases Li at a potential of approximately 1.5 V with respect to the standard redox potential ($Li/Li^+$) of lithium. Therefore, when $Li_4Ti_5O_{12}$ is used in a lithium ion secondary battery as the negative electrode active material, a lithium metal tends not to be deposited on the negative electrode even when reaction overpotential is caused by, for example, quick charging, and very small lattice expansion and contraction results from charge and discharge. Accordingly, the use of $Li_4Ti_5O_{12}$ as the negative electrode active material results in a considerably low cycle degradation rate of a single electrode and thereby a further improvement in charge and discharge cycle characteristics can be expected.

For the negative electrode active material contained in the negative electrode mixture layer 2b, a Ti-based oxide other than lithium titanate ($Li_4Ti_5O_{12}$) also can be used. Furthermore, a plurality of different materials may be mixed together to be used as the negative electrode active material. When the negative electrode active material is a powder, the average particle diameter thereof is not particularly limited but a powder with an average particle diameter of, for example, 0.05 to 30 μm is preferable. The negative electrode mixture layer 2b generally has a thickness of approximately 50 to 200 μm but the thickness is not particularly limited. The positive electrode mixture layer 2b may have a thickness of 0.1 to 50 μm. The average particle diameter described herein is a value measured by the laser diffraction scattering method.

The negative electrode mixture layer 2b further contains an additive composed of fluorinated carbon that reacts with lithium at a more noble potential as compared to the negative electrode active material (i.e., that has a more noble reaction potential as compared to the negative electrode active material). The additive has a more noble reaction potential as compared to the negative electrode active material and undergoes a reduction reaction in a potential region located between the positive electrode and the negative electrode during the initial charge. Addition of such an additive to the negative electrode allows the additive to be electrochemically reduced during the initial charge before the negative electrode active material is electrochemically reduced. As a result, the negative electrode has a larger irreversible capacity and thereby the battery can be designed to have the negative electrode limitation at the end of discharge. Furthermore, fluorinated carbon has a more noble reaction potential with respect to lithium as compared to the negative electrode active material composed of a Ti-based oxide and further has a very large reaction capacity with respect to lithium. Therefore, the use of fluorinated carbon allows the negative electrode limitation to occur while keeping the amount of the additive small. As a result, the addition of the additive does not cause a considerable decrease in the rate of the negative electrode active material contained in the negative electrode and therefore the negative electrode capacity also does not decrease considerably.

The amount of the additive to be added to the negative electrode is not particularly limited since it is desirable to determine the amount suitably according to the material to be used as the additive and the material to be used as the negative electrode active material. However, an amount that at least allows the negative electrode limitation to occur at the end of discharge, i.e., an amount that at least allows the irreversible capacity of the negative electrode during the initial charge/discharge to be larger than that of the positive electrode during the initial charge/discharge, is added to the negative electrode. As described above, in the case where the irreversible capacity of the positive electrode active material is larger than that of the negative electrode active material, when the amount of the additive to be added to the negative electrode is an amount that exceeds the capacity of the difference in irreversible capacity between the positive electrode active material and the negative electrode active material, the negative electrode limitation can occur.

The fluorinated carbon to be used in the additive can be, for example, graphite fluoride $((C_xF)_n$, x: $1.0 \leq x \leq 2.0)$. Among them, $(CF)_n$ and $(C_2F)_n$ are generally known as positive electrode active materials for lithium primary batteries. Since the theoretical electric capacities at which they electrochemically react with lithium ions are 864 mAh/g and 623 mAh/g, respectively, $(CF)_n$ can be used suitably, where x=1.0.

At least a part of the additive added to the negative electrode is reduced during the initial charge. Therefore, a substance obtained after reduction of the additive is contained in the negative electrode after the initial charge. Furthermore, the negative electrode also contains a part of the additive added thereto, with the part remaining in the original state without having been reduced.

For the negative electrode collector $2a$, an aluminum foil is preferable, but for example, a copper foil, a nickel foil, or a stainless steel foil may be used. Furthermore, the negative electrode collector $2a$ may have the same form as that of the positive electrode collector $1a$ described above.

For the separator 3, not only the polyethylene microporous sheet but also a polypropylene microporous sheet, a nonwoven fabric sheet, a sheet obtained through beating and papermaking using cellulose fibers, and a sheet made of a complex thereof can be used. It should be understood that in addition to these, materials that can be used as separators of the lithium ion secondary batteries can be used.

Next, the charge and discharge curves of the positive electrode and the negative electrode during the initial charge and discharge of the lithium ion secondary battery of this embodiment are described using, as an example, the charge and discharge curves of a lithium ion secondary battery of Example 1 described later.

Figure 5:
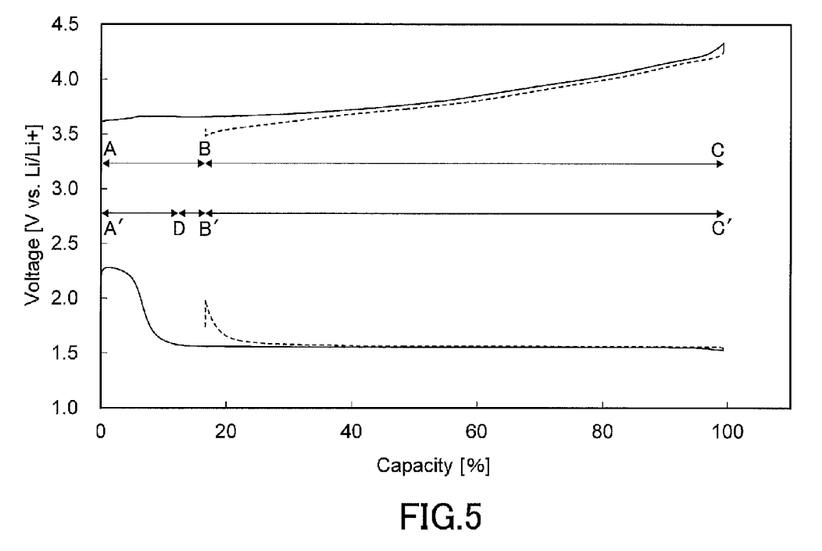
FIG. 5 shows initial charge and discharge curves of a negative electrode active material and a positive electrode active material of Example 1 with respect to a metal Li.

FIG. 5 shows charge and discharge curves of the lithium ion secondary battery of Example 1 described later. In FIG. 5, (A-C) indicates the initial charging capacity of the positive electrode and the battery, (B-C) indicates the initial discharge capacity of the positive electrode and the battery, and (A-B) indicates the irreversible capacity of the battery. Essentially, a positive electrode as a single electrode undergoes a rapid potential change at the end of discharge. In this case, however, the irreversible capacity of the positive electrode is smaller than the irreversible capacity (A-B) of the battery and therefore no rapid potential change occurs.

In FIG. 5, (A'-C') indicates the initial charging capacity of the negative electrode and the battery and the capacity is the same as the capacity (A-C) of the positive electrode. In the negative electrode during the initial charge, first the additive is electrochemically reduced and the portion (A'-D) is charged and then the negative electrode active material is charged with lithium ions. Accordingly, (A'-D) indicates the charging capacity obtained after the reduction of the additive, and (D-C') indicates the initial charging capacity of the negative electrode active material. (B'-C') indicates the initial discharge capacity of the negative electrode and the capacity is the same as the capacity (B-C) of the positive electrode. (A'-B') indicates the irreversible capacity of the battery and the portion (D-B') thereof indicates the irreversible capacity of the negative electrode active material.

As is understood from FIG. 5, at the end of discharge, the single electrode potential of the negative electrode changes before the single electrode potential of the positive electrode changes and thereby the battery voltage reaches the discharge cut-off voltage. This shows that (A'-B') indicates the initial irreversible capacity of the negative electrode and the initial irreversible capacity of the positive electrode is smaller than (A-B).

That is to say, as described above, the amount of the additive used in this embodiment is determined in such a manner that the sum (A'-B') of the irreversible capacity of the negative electrode and the reaction capacity of the additive is a value that exceeds the irreversible capacity of the positive electrode.

As described above, the additive that is electrochemically reduced during the initial charge is added to the negative electrode and thereby the battery voltage reaches the discharge cut-off voltage due to the negative electrode limitation at the end of discharge. Accordingly, the positive electrode can be prevented from undergoing a large potential change and thereby the cycle degradation of the positive electrode can be suppressed, which allows the cycle characteristics of the battery to be improved.

The nonaqueous electrolyte secondary battery of this embodiment can be manufactured by a method including, for example, a positive electrode production step for producing a positive electrode containing a positive electrode active material composed of a lithium-containing transition metal oxide having a layered crystal structure;

a negative electrode production step for preparing a mixture containing a negative electrode active material composed of a Ti-based oxide and an additive composed of fluorinated carbon that reacts with lithium at a more noble potential as compared to the negative electrode active material and producing a negative electrode using the mixture, and an assembly step in which using the positive electrode obtained in the positive electrode production step, the negative electrode obtained in the negative electrode production step, and a separator, an electrode group is produced with the separator being disposed between the positive electrode and the negative electrode and the electrode group is impregnated with a nonaqueous electrolyte.

A step of producing a positive electrode of a common nonaqueous electrolyte secondary battery can be used for the positive electrode production step. For example, first a positive electrode active material is produced and then a positive electrode mixture in a slurry state containing the positive electrode active material thus obtained and other materials such as a conductive agent is produced. Then the positive electrode mixture is applied to one surface of a positive electrode collector and a coated film formed thereby is dried. Thus the positive electrode can be produced.

A step of producing a negative electrode of a common nonaqueous electrolyte secondary battery can be used for the negative electrode production step. For example, first a negative electrode active material is produced and then a negative electrode mixture in a slurry state containing the negative electrode active material thus obtained, the additive, and other materials such as a conductive agent is produced. Then the negative electrode mixture is applied to one surface of a negative electrode collector and a coated film formed thereby is dried. Thus the negative electrode can be produced.

A step of assembling a common nonaqueous electrolyte secondary battery can be used for the assembly step. For example, a method can be used in which the positive electrode and the negative electrode are stacked, with the separator being interposed therebetween, to form an electrode group, then this electrode group is inserted into a battery case, and a nonaqueous electrolyte solution is injected thereinto, which is then sealed.

In this embodiment, a sheet-type lithium ion secondary battery was described as an example, but the lithium ion secondary battery of this embodiment may have another shape. For example, the lithium ion secondary battery of this embodiment may have a cylindrical or rectangular shape. Furthermore, it may have a large shape to be used for electric vehicles, etc.

The lithium ion secondary battery of this embodiment can be used for a personal digital assistant, a portable electronic device, a small home electric power storage system, a motorcycle, an electric vehicle, a hybrid electric vehicle, etc. Furthermore, it can also be used for devices other than those described above.

EXAMPLES

Hereinafter, the present invention is described further in detail with reference to examples. However, the present invention is not limited to the examples.

1. Production of Battery

Example 1

<Production of Positive Electrode>

First, $LiNi_{0.80}Co_{0.15}Al_{0.05}O_2$ was prepared as a positive electrode active material. The method of preparing $LiNi_{0.80}Co_{0.15}Al_{0.05}O_2$ is as follows.

Cobalt sulfate of a predetermined ratio was added to a nickel sulfate aqueous solution with a concentration of 1 mol/l and thereby a metal salt aqueous solution was prepared. While this metal salt aqueous solution was maintained at 50° C. and stirred at low speed, an alkaline solution containing 30 wt % of sodium hydroxide was dropped thereinto so that a pH of 12 was obtained, and thereby hydroxide was precipitated. This precipitate was filtrated and washed with water, which was then heated in the air to 80° C. to be dried.

Next, the hydroxide thus obtained was stirred in water inside a reaction vessel at 30° C. and then a predetermined amount of $NaAlO_2$ was added into the reaction vessel, which was then stirred sufficiently. After that, the solution inside the reaction vessel was neutralized using sulfuric acid until it had a pH of 9. As a result, aluminum hydroxide, which was a compound containing Al, was deposited on the surface of the hydroxide uniformly. Thereafter, water was removed and it was baked in an air atmosphere at 700° C. for 10 hours. Thus, a ternary oxide $[Ni_{0.80}Co_{0.15}Al_{0.05}]$ was obtained. It was confirmed by X-ray powder diffraction (with a device manufactured by Rigaku) that the oxide thus obtained had a single phase.

Furthermore, the oxide obtained above was mixed with a powder of lithium hydroxide monohydrate in such a manner that the ratio between the total number of moles of Ni, Co, and Al and the number of moles of Li was 1:1. The temperature of this mixture was allowed to rise to 750° C. in an oxygen atmosphere over 10 hours and then it was heat-treated at 750° C. for 36 hours. Thus, intended $LiNi_{0.80}Co_{0.15}Al_{0.05}O_2$ was obtained. It was confirmed by the X-ray powder diffraction (with a device manufactured by Rigaku) that $LiNi_{0.80}Co_{0.15}Al_{0.05}O_2$ thus obtained had a single phase, hexagonal layered structure. After it was pulverized and classified, it was observed with a scanning electron microscope (manufactured by Hitachi High-Technologies). As a result, it was confirmed that a large number of primary particles of approximately 0.2 μm to 1.0 μm aggregated to form substantially spherical or ellipsoidal secondary particles. The average particle diameter was determined using a scattering particle size distribution analyzer (manufactured by HORIBA).

Next, the $LiNi_{0.80}Co_{0.15}Al_{0.05}O_2$ powder obtained above was used to produce a positive electrode. $LiNi_{0.80}Co_{0.15}Al_{0.05}O_2$, acetylene black (AB) as a conductive agent, and polyvinylidene fluoride (PVdF) as a binding agent were weighed in such a manner as to have a weight ratio of $LiNi_{0.80}Co_{0.15}Al_{0.05}O_2$:AB:PVdF=100:5:2.55. Then an appropriate amount of N-methyl-2-pyrrolidone (NMP) was added thereto, which was stirred and mixed together. Thus a positive electrode mixture in a slurry state was obtained.

Next, as shown in FIG. 1C, the positive electrode mixture in a slurry state was applied to one surface of the collector 1a made of an aluminum foil with a thickness of 20 μm. Then the coated film was dried and rolled with a roller. Thus the positive electrode mixture layer 1b was obtained.

Figure 2:
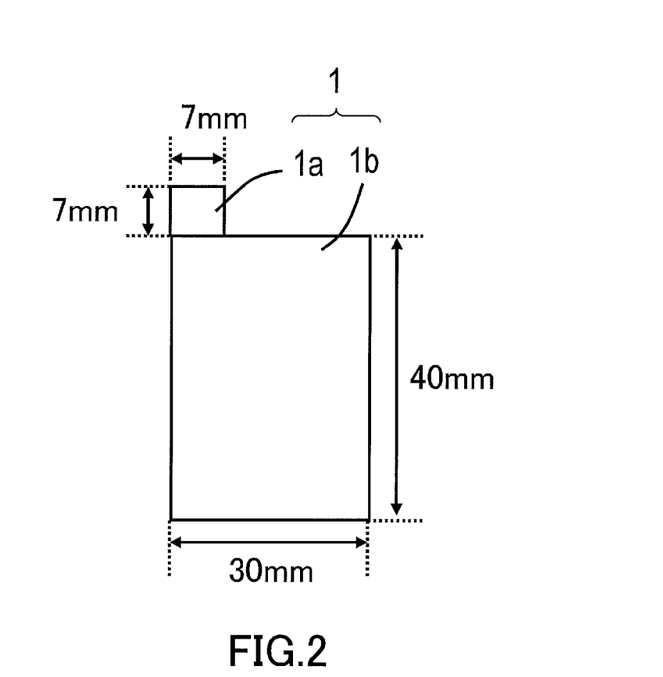
FIG. 2 is a diagram showing the size of a positive electrode 1 produced in each of Examples 1 to 4 and Comparative Examples 1 and 2.

The electrode plate thus obtained was punched into a size shown in FIG. 2 and then the positive electrode mixture layer 1b of a tab part, which is a lead attachment part, was removed. Thus the positive electrode 1 was obtained. The positive electrode collector 1a provided with the positive electrode mixture layer 1b had a rectangular shape with a size of 30 mm×40 mm.

<Production of Electrolytic Solution>

Lithium hexafluorophosphate ($LiPF_6$) was added to propylene carbonate (PC) and dissolved to have a concentration of 1.0 M. Thus an electrolytic solution was prepared.

<Production of Negative Electrode>

First, $Li_4Ti_5O_{12}$ (the average particle diameter≤1 μm) was prepared as a negative electrode active material. The method of preparing $Li_4Ti_5O_{12}$ used as the negative electrode active material is as follows. In this regard, the average particle diameter is a value measured with the scattering particle size distribution analyzer (manufactured by HORIBA).

Raw powders of commercial reagents $LiOH.H_2O$ and $TiO_2$ were weighed in such a manner that the molar mixing ratio of Li/Ti showed a small excess of Li with respect to the stoichiometric ratio. Then, they were mixed in a mortar. The raw material $TiO_2$ used herein was one having an anatase-type crystal structure.

The raw powder thus mixed was placed in a crucible made of $Al_2O_3$ and was then heat-treated in an air atmosphere at 850° C. for 12 hours. Thus, the intended $Li_4Ti_5O_{12}$ was obtained.

The material thus heat-treated was taken out of the crucible and was then pulverized in a mortar. Thus a coarse powder of $Li_4Ti_5O_{12}$ was obtained. The $Li_4Ti_5O_{12}$ coarse powder thus obtained was measured by X-ray powder diffraction (with a device manufactured by Rigaku). As a result, a single-phase diffraction pattern formed of a spinel structure belonging to the space group Fd3m was obtained.

Subsequently, jet mill pulverization and classification were carried out using the $Li_4Ti_5O_{12}$ coarse powder obtained above. It was confirmed from the observation with a scanning electron microscope (manufactured by Hitachi High-Technologies) that the powder thus obtained had been pulverized into single particles with a particle diameter of approximately 0.7 μm.

Next, a negative electrode was produced using the $Li_4Ti_5O_{12}$ powder obtained by the method described above. $Li_4Ti_5O_{12}$, vapor-grown carbon fibers (manufactured by Showa Denko K.K., VGCF) as a conductive agent, polyvinylidene fluoride (PVdF) as a binding agent, and graphite fluoride (manufactured by Daikin Industries, Ltd., $(CF)_n$) as an additive were weighed in such a manner as to have a weight ratio of $Li_4Ti_5O_{12}$:VGCF:PVdF:$(CF)_n$=100:5:4:1.82. Then an appropriate amount of N-methyl-2-pyrrolidone (NMP) was added thereto, which was stirred and mixed together. Thus a negative electrode mixture in a slurry state was obtained.

Next, as show in FIG. 1C, the negative electrode mixture in a slurry state was applied to one surface of the collector 2a made of an aluminum foil with a thickness of 20 μm. Then the coated film was dried and rolled with a roller. Thus the negative electrode mixture layer 2b was obtained.

Figure 3:
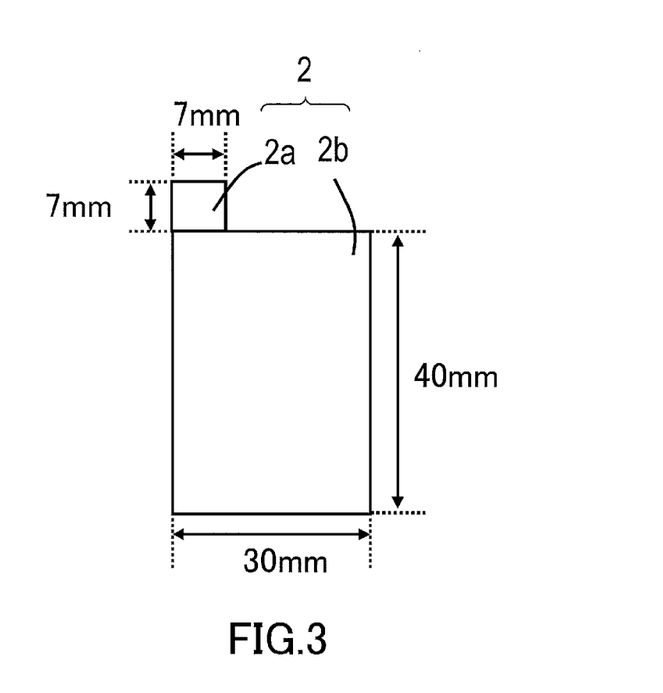
FIG. 3 is a diagram showing the size of a negative electrodes 2 produced in each of Examples 1 to 4 and Comparative Examples 1 and 2.

The electrode plate thus obtained was punched into a size shown in FIG. 3 and then the negative electrode mixture layer 2b of a tab part, which is a lead attachment part, was removed. Thus the negative electrode 2 was obtained. The negative electrode collector 2a provided with the negative electrode mixture layer 2b had a rectangular shape with a size of 30 mm×40 mm.

<Assembly>

The positive electrode 1 and negative electrode 2 obtained above were stacked with a separator 3 being interposed therebetween and thereby an electrode group 13 as shown in FIG. 1C was produced. The separator 3 used herein was a polyethylene microporous sheet with a thickness of 20 μm that had been surface-treated.

Next, as shown in FIG. 1A, an aluminum positive electrode lead 11 was welded to the positive electrode 1 of the electrode group 13 while an aluminum negative electrode lead 12 was welded to the negative electrode 2. After that, the electrode group 13 was housed in a battery case 14 made of an aluminum laminate film with a thickness of 0.12 mm that had openings in three directions and was then fixed to the inner surface of the battery case 14 with a polypropylene tape. The openings including the openings, from which the positive electrode lead 11 and the negative electrode lead 12 were led out, were heat-sealed, with only one opening being left without being heat-sealed, which allowed the battery case 14 to have a bag-like shape. The electrolytic solution prepared as the electrolytic solution 15 was injected through the opening that had not been heat-sealed, which was then decompressed and degassed. Thereafter, the opening was heat-sealed under reduced pressure and thereby the inside of the battery was sealed.

Example 2

A battery was produced by the same method as that used in Example 1 except that the amount of graphite fluoride contained in the negative electrode mixture was different. The negative electrode mixture was weighed in such a manner that a weight ratio of $Li_4Ti_5O_{12}$:VGCF:PVdF:$(CF)_n$=100:5:4:0.82 was obtained. Then an appropriate amount of N-methyl-2-pyrrolidone (NMP) was added thereto, which was stirred and mixed together. Thus a negative electrode mixture in a slurry state was obtained.

Comparative Example 1

A battery was produced by the same method as that used in Example 1 except that the additive, which reacted with lithium at a more noble potential as compared to the negative electrode active material, was not added to the negative electrode mixture. The negative electrode mixture was weighed in such a manner that a weight ratio of $Li_4Ti_5O_{12}$:VGCF:PVdF=100:5:4 was obtained. Then an appropriate amount of N-methyl-2-pyrrolidone (NMP) was added thereto, which was stirred and mixed together. Thus a negative electrode mixture in a slurry state was obtained.

Example 3

A battery was produced by the same method as that used in Example 1 except that the negative electrode mixture was different. $Li_4Ti_5O_{12}$ produced by the same method as that used in Example 1, acetylene black (AB) as a conductive agent, polyvinylidene fluoride (PVdF) as a binding agent, and graphite fluoride (manufactured by Daikin Industries, Ltd., $(CF)_n$) were weighed in such a manner as to have a weight ratio of $Li_4Ti_5O_{12}$:AB:PVdF:$(CF)_n$=100:5:4:2.9. Then an appropriate amount of N-methyl-2-pyrrolidone (NMP) was added thereto, which was stirred and mixed together. Thus a negative electrode mixture in a slurry state was obtained.

Example 4

A battery was produced by the same method as that used in Example 1 except that the negative electrode mixture was different. $Li_4Ti_5O_{12}$ produced by the same method as that used in Example 1, acetylene black (AB) as a conductive agent, polyvinylidene fluoride (PVdF) as a binding agent, and graphite fluoride (manufactured by Daikin Industries, Ltd., $(CF)_n$) were weighed in such a manner as to have a weight ratio of $Li_4Ti_5O_{12}$:AB:PVdF:$(CF)_n$=100:5:4:2.2. Then an appropriate amount of N-methyl-2-pyrrolidone (NMP) was added thereto, which was stirred and mixed together. Thus a negative electrode mixture in a slurry state was obtained.

Comparative Example 2

A battery was produced by the same method as that used in Example 3 except that graphite fluoride was not added to the negative electrode mixture.

Example 5

In Example 5, a battery was produced for confirming a suitable material as the additive to be added to the negative electrode. Therefore, the battery implemented herein has a different configuration from that of the nonaqueous electrolyte secondary battery of the present invention and a material used as an additive was used as a positive electrode active material. Furthermore, the positive electrode and negative electrode produced in Example 5 were different in, for example, materials composing them from those of the nonaqueous electrolyte secondary battery of the present invention. However, for convenience sake, the battery of this example is described using FIGS. 1A to 1C and FIG. 2 further with reference to FIG. 4. The same applies to Comparative Examples 3 to 7 below.

<Production of Positive Electrode>

$(CF)_n$ (manufactured by Daikin Industries, Ltd.), acetylene black (AB) as a conductive agent, and polyvinylidene fluoride (PVdF) as a binding agent were weighed in such a manner as to have a weight ratio of $(CF)_n$:AB:PVdF=100:10:3. Then an appropriate amount of N-methyl-2-pyrrolidone (NMP) was added thereto, which was stirred and mixed together. Thus a positive electrode mixture in a slurry state was obtained.

Next, as shown in FIG. 2, the positive electrode mixture in a slurry state was applied to one surface of the collector 1a made of an aluminum foil with a thickness of 20 μm. Then the coated film was dried and rolled with a roller. Thus the positive electrode mixture layer 1b was obtained.

The electrode plate thus obtained was punched into a size shown in FIG. 2 and then the positive electrode mixture layer 1b of a tab part, which is a lead attachment part, was removed. Thus the positive electrode 1 was obtained. The positive electrode collector 1a provided with the positive electrode mixture layer 1b had a rectangular shape with a size of 30 mm×40 mm.

<Preparation of Electrolytic Solution>

Lithium hexafluorophosphate ($LiPF_6$) was added to propylene carbonate (PC) and dissolved to have a concentration of 1.0 M. Thus an electrolytic solution was prepared.

<Production of Negative Electrode>

Figure 4:
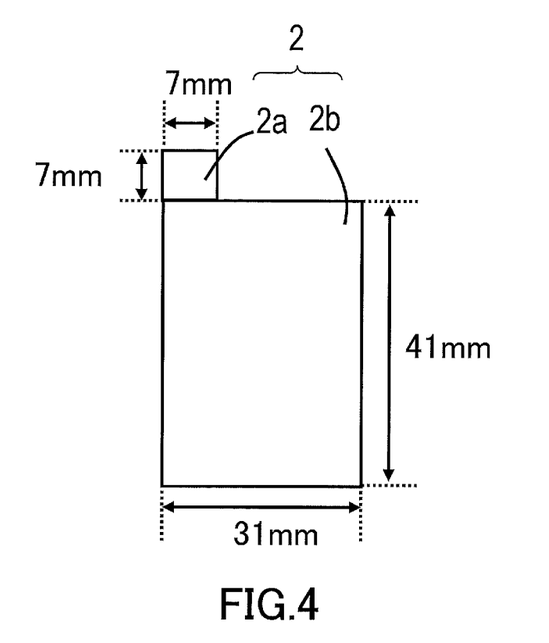
FIG. 4 is a diagram showing the size of a negative electrode 2 produced in each of Example 5 and Comparative Examples 3 to 7.

First, a mesh made of stainless steel (SUS304) was punched into a size shown in FIG. 4 to form a negative electrode collector 2a. The negative electrode collector 2a includes an electrode portion having a rectangular shape with a size of 31 mm×41 mm and a lead attachment part having a square shape of 7 mm×7 mm. Metal lithium 2b with a thickness of 150 μm was fixed by pressure onto the electrode portion of the negative electrode collector 2a and thereby the negative electrode 2 was obtained.

<Assembly>

The positive electrode 1 and negative electrode 2 obtained above were stacked with a separator 3 being interposed therebetween and thereby an electrode group 13 as shown in FIG. 1C was produced. The separator used herein was a polyethylene microporous sheet with a thickness of 20 μm that had been surface-treated.

Next, as shown in FIG. 1A, an aluminum positive electrode lead 11 was welded to the positive electrode 1 of the electrode group 13 while a nickel negative electrode lead 12 was welded to the negative electrode 2. After that, the electrode group 13 was housed in a battery case 14 made of an aluminum laminate film with a thickness of 0.12 mm that had openings in three directions and was then fixed to the inner surface of the battery case 14 with a polypropylene tape. The openings including the openings, from which the positive electrode lead 11 and the negative electrode lead 12 were led out, were heat-sealed, with only one opening being left without being heat-sealed, which allowed the battery case 14 to have a bag-like shape. The electrolytic solution prepared as the electrolytic solution 15 was injected through the opening that had not been heat-sealed, which was then decompressed and degassed. Thereafter, the opening was heat-sealed under reduced pressure and thereby the inside of the battery was sealed.

Comparative Example 3

A battery was produced by the same method as that used in Example 5 except that the positive electrode mixture was different. The positive electrode mixture was produced as follows. $Fe_2O_3$ (manufactured by Kanto Chemical), acetylene black (AB) as a conductive agent, and polyvinylidene fluoride (PVdF) as a binding agent were weighed in such a manner as to have a weight ratio of $Fe_2O_3$:AB:PVdF=100:10:3. Then an appropriate amount of N-methyl-2-pyrrolidone (NMP) was added thereto, which was stirred and mixed together into a slurry state.

Comparative Example 4

A battery was produced by the same method as that used in Example 5 except that the positive electrode mixture was different. The positive electrode mixture was produced as follows. $Co_3O_4$ (manufactured by Kanto Chemical), acetylene black (AB) as a conductive agent, and polyvinylidene fluoride (PVdF) as a binding agent were weighed in such a manner as to have a weight ratio of $Co_3O_4$:AB:PVdF=100:10:3. Then an appropriate amount of N-methyl-2-pyrrolidone (NMP) was added thereto, which was stirred and mixed together into a slurry state.

Comparative Example 5

A battery was produced by the same method as that used in Example 5 except that the positive electrode mixture was different. The positive electrode mixture was produced as follows. CuO (manufactured by Kanto Chemical), acetylene black (AB) as a conductive agent, and polyvinylidene fluoride (PVdF) as a binding agent were weighed in such a manner as to have a weight ratio of CuO:AB:PVdF=100:10:3. Then an appropriate amount of N-methyl-2-pyrrolidone (NMP) was added thereto, which was stirred and mixed together into a slurry state.

Comparative Example 6

A battery was produced by the same method as that used in Example 5 except that the positive electrode mixture was different. The positive electrode mixture was produced as follows. $MnO_2$ (manufactured by Kanto Chemical), acetylene black (AB) as a conductive agent, and polyvinylidene fluoride (PVdF) as a binding agent were weighed in such a manner as to have a weight ratio of $MnO_2$:AB:PVdF=100:10:3. Then an appropriate amount of N-methyl-2-pyrrolidone (NMP) was added thereto, which was stirred and mixed together into a slurry state.

Comparative Example 7

A battery was produced by the same method as that used in Example 5 except that the positive electrode mixture was different. The positive electrode mixture was produced as follows. $ZrO_2$ (manufactured by Kanto Chemical), acetylene black (AB) as a conductive agent, and polyvinylidene fluoride (PVdF) as a binding agent were weighed in such a manner as to have a weight ratio of $ZrO_2$:AB:PVdF=100:10:3. Then an appropriate amount of N-methyl-2-pyrrolidone (NMP) was added thereto, which was stirred and mixed together into a slurry state.

2. Evaluation of Batteries

<Evaluation of Initial Charge and Discharge Curves>

In order to check the change in single electrode potential at the end of discharge during the initial charge and discharge, the battery produced in Example 1 was discharged after being charged once. In this evaluation test, "charge" is a control in the direction of increasing the potential of the positive electrode and decreasing the potential of the negative electrode. "Discharge" is a control in the opposite direction thereto. The charge and discharge device used herein was a charge and discharge system manufactured by Toyo System Co, Ltd. The voltage range for charge and discharge was set between 1.5 V and 2.8 V in terms of battery voltage. The current rate was set at 0.05C rate. In this regard, a 1C rate is defined as a current value indicating one hour discharge rate, and the 0.05C rate is a current value of 0.05 times the 1C rate, that is, a current value indicating the 20 hour discharge rate.

FIG. 5 shows charge and discharge curves during the initial charge and discharge obtained by the measurement described above. In FIG. 5, the details (for example, meanings of A, B, C, A', B', C', and D) are as described previously and therefore the descriptions thereof are not repeated here. For simplicity's sake, in the charge and discharge curves, the horizontal axis indicates the percentage of the capacity, with the full charge capacity being 100%.

In the battery of Example 1, the additive underwent a reduction reaction before the negative electrode active material underwent a reduction reaction during the initial charge, and thereby the single electrode potential of the negative electrode changed at the end of discharge. Thus the battery voltage reached the discharge cut-off voltage, resulting in the negative electrode limitation. This results from the fact that the sum of the irreversible capacity of the negative electrode and the reaction capacity of the additive is larger than the irreversible capacity of the positive electrode during the initial charge and discharge.

With respect to the batteries of Examples 2 to 4, the charge and discharge curves obtained during the initial charge and discharge were prepared in the same manner and thereby negative electrode limitation was confirmed.

<Evaluation of Cycle Characteristics>

With respect to the batteries produced in Examples 1 and 2 and Comparative Example 1, their cycle characteristics were evaluated. In charging, the batteries were charged with a constant current corresponding to the 1C rate up until 2.8V was reached and then with a 2.8V constant voltage until a current corresponding to the 0.05C rate was reached. In discharging, a constant current discharge corresponding to the 1C rate was carried out until 1.5 V was reached. Such a charge and discharge cycle was repeated. The charge and discharge were carried out in a 25° C. constant temperature bath. The charge and discharge were repeated up to 50 cycles. The change in capacity retention ratio with the cycle is shown in FIG. 6 and the capacity retention ratio obtained after 50 cycles is shown in Table 2, with the ratio of the discharge capacity in each cycle to the initial discharge capacity being the capacity retention ratio.

With respect to the batteries produced in Examples 3 and 4 and Comparative Example 2, their cycle characteristics were evaluated. In charging, the batteries were charged with a constant current corresponding to the 4C rate up until 2.6V was reached and then with a 2.6V constant voltage until a current corresponding to the 0.05C rate was reached. In discharging, a constant current discharge corresponding to the 4C rate was carried out until 1.5 V was reached. Such a charge and discharge cycle was repeated. The charge and discharge were carried out in a 60° C. constant temperature bath. The change in capacity retention ratio with the cycle is shown in FIG. 7, with the ratio of the discharge capacity in each cycle to the initial discharge capacity being the capacity retention ratio.

Figure 6:
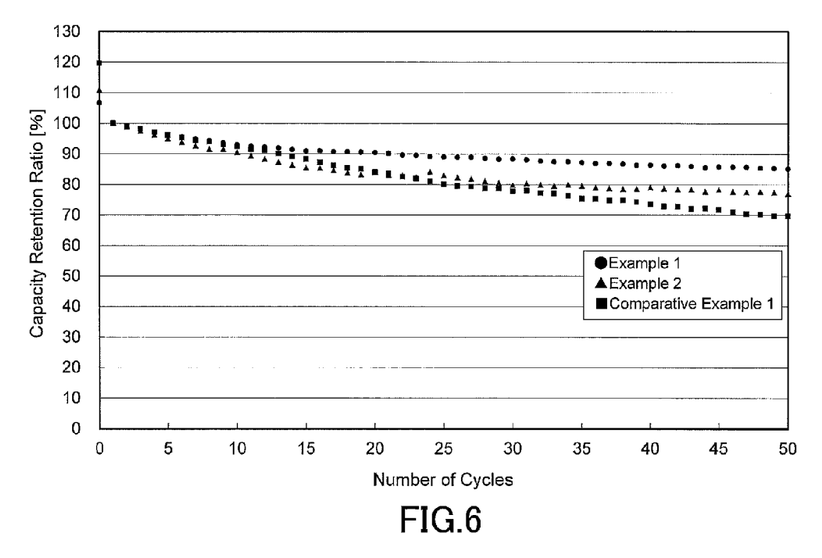
FIG. 6 is a graph showing the cycle characteristics of the batteries produced in Examples 1 and 2 and Comparative Example 1.

The results shown in FIG. 6 and Table 1 showed that the batteries of Example 1 and Example 2 in which the negative electrode limitation occurred at the end of discharge by using the additive in the negative electrode were excellent in cycle characteristics as compared to the battery of Comparative Example 1 in which the positive electrode limitation occurred at the end of discharge. In the battery of Example 2, the negative electrode limitation was slightly closer to the positive-negative electrode limitation. Therefore, the battery of Example 1 in which the complete negative electrode limitation occurred was better in cycle characteristics than the battery of Example 2.

Figure 7:
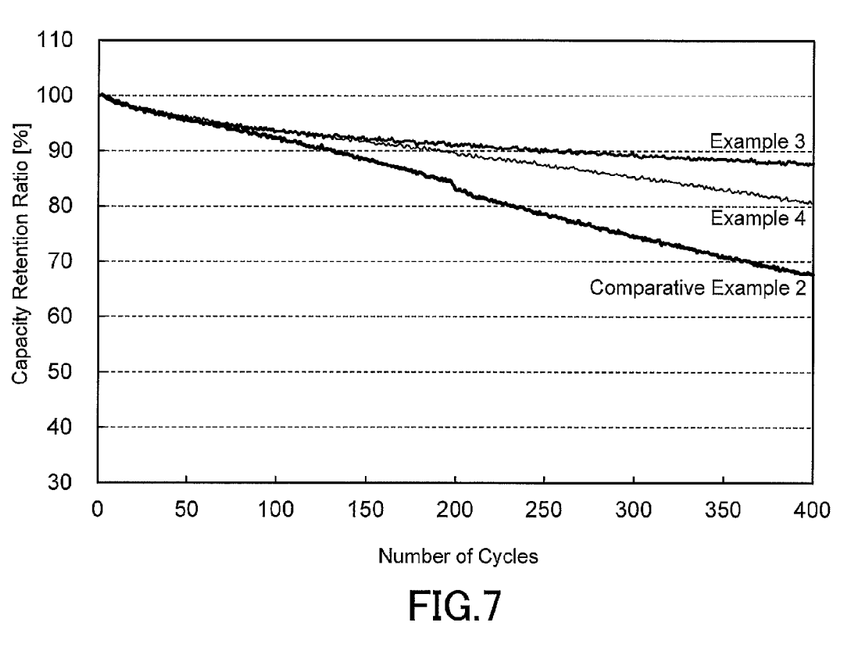
FIG. 7 is a graph showing the cycle characteristics of the batteries produced in Examples 3 and 4 and Comparative Example 2.

The results shown in FIG. 7 showed that the batteries of Example 3 and Example 4 in which the negative electrode limitation occurred at the end of discharge by using the additive in the negative electrode were excellent in cycle characteristics as compared to the battery of Comparative Example 2 in which the positive electrode limitation occurred at the end of discharge. In the battery of Example 4, the negative electrode limitation was slightly closer to the positive-negative electrode limitation. Therefore, the battery of Example 3 in which the complete negative electrode limitation occurred was better in cycle characteristics than the battery of Example 4.

It can be considered that the batteries of Examples 1 to 4 had improved cycle characteristics for the following reason. That is, adding the additive to the negative electrode allowed the negative electrode limitation to occur at the end of discharge and thereby the positive electrode as a single electrode was prevented from undergoing a potential change, which suppressed the cycle degradation of the positive electrode as a single electrode.

3. Evaluation of Reaction Potential and Reaction Capacity of Additive with Respect to Lithium In order to check the reaction potential and reaction capacity of the additive during the initial charge, the batteries produced in Example 5 and Comparative Examples 3 to 7 were charged once. The positive electrode active material to be evaluated was the additive to be added to the negative electrode. Therefore, in this test, the charge denotes the direction in which the potential of the positive electrode active material is decreased. The charge and discharge device used herein was a charge and discharge system manufactured by Toyo System Co, Ltd. The lower limit voltage for the charge was 1.5V. The current rate was set to 0.05C rate.

The reaction potential and reaction capacity of the positive electrode active material in the initial charge measured as described above were shown together in Table 2. As can be seen from Table 2, $(CF)_n$ that was used as the positive electrode active material in the battery of Example 5 had a reaction potential that was more noble than 1.5 V ($Li_4Ti_5O_{12}$ reaction potential) with respect to the standard redox potential of lithium ($Li/Li^+$), and furthermore had a very high reaction capacity as compared to the metal oxides used in Comparative Examples 3 to 7. That is, it was found that in terms of the reaction potential and reaction capacity with respect to lithium, $(CF)_n$ was a material suitable as the additive when the negative electrode active material composed of $Li_4Ti_5O_{12}$ was used for the negative electrode of the present invention.

TABLE 1

| | Capacity Retention Ratio After 50 Cycles (%) |
|---|---|
| Example 1 | 85.2 |
| Example 2 | 76.9 |
| Comparative Example 1 | 69.6 |

TABLE 2

| | Positive Electrode Active Material | Reaction Potential (V) | Reaction Capacity (mAh/g) |
|---|---|---|---|
| Example 5 | $(CF)_n$ | 3.4-1.6 | 850 |
| Comparative Example 3 | $Fe_2O_3$ | 1.7-1.2 | 30 |
| Comparative Example 4 | $Co_3O_4$ | 1.4-1.2 | 0 |
| Comparative Example 5 | CuO | 2.4-1.2 | 100 |
| Comparative Example 6 | $MnO_2$ | 3.3-2.5 | 200 |
| Comparative Example 7 | $ZrO_2$ | 3.1-1.2 | 0 |

INDUSTRIAL APPLICABILITY

According to the present invention, nonaqueous electrolyte secondary batteries with excellent cycle characteristics can be obtained. Therefore, they also can be used for home electric power storage systems, motor-powered motorcycles, electric vehicles, hybrid electric vehicles, etc.

The invention claimed is:

1. A nonaqueous electrolyte secondary battery, comprising:
a positive electrode containing a positive electrode active material composed of a lithium-containing transition metal oxide having a layered crystal structure;
a negative electrode containing a negative electrode active material composed of a Ti-based oxide and an additive composed of fluorinated carbon that reacts with lithium at a more noble potential as compared to the negative electrode active material;
a separator disposed between the positive electrode and the negative electrode; and
a nonaqueous electrolyte,
wherein voltage of the battery reaches a discharge cut-off voltage by a potential change in the negative electrode.

2. The nonaqueous electrolyte secondary battery according to claim 1, wherein the additive is added in the negative electrode in a range of 3 parts by weight or less with respect to 100 parts by weight of the negative electrode active material.

3. The nonaqueous electrolyte secondary battery according to claim 1, wherein the Ti-based oxide is $Li_4Ti_5O_{12}$.

4. A method of manufacturing a nonaqueous electrolyte secondary battery, comprising:
a positive electrode production step for producing a positive electrode containing a positive electrode active material composed of a lithium-containing transition metal oxide having a layered crystal structure;
a negative electrode production step for preparing a mixture containing a negative electrode active material composed of a Ti-based oxide and an additive composed of fluorinated carbon that reacts with lithium at a more noble potential as compared to the negative electrode active material and producing a negative electrode using the mixture, and
an assembly step in which using the positive electrode obtained in the positive electrode production step, the negative electrode obtained in the negative electrode production step, and a separator, an electrode group is produced with the separator being disposed between the positive electrode and the negative electrode and the electrode group is impregnated with a nonaqueous electrolyte.

* * * * *